US012628853B2

(12) United States Patent
Leskauskaitė et al.

(10) Patent No.: US 12,628,853 B2
(45) Date of Patent: May 19, 2026

(54) NUTRIENTS-DENSE 3D-PRINTED FOODS FOR THE ELDERLY AND PEOPLE WITH SWALLOWING DISORDERS

(71) Applicant: Kaunas University of Technology, Kaunas (LT)

(72) Inventors: Daiva Leskauskaitė, Kaunas (LT); Rimantė Vinauskienė, Kaunas (LT); Viktorija Eisinaitė, Kaunas (LT); Ina Jasutienė, Kaunas (LT); Milda Keršienė, Kaunas (LT); Aušra Šipailienė, Kaunas (LT)

(73) Assignee: Kaunas University of Technology, Kaunas (LT)

( * ) Notice: Subject to any disclaimer, the term of this patent is extended or adjusted under 35 U.S.C. 154(b) by 312 days.

(21) Appl. No.: 18/332,052

(22) Filed: Jun. 9, 2023

(65) Prior Publication Data

US 2024/0407409 A1     Dec. 12, 2024

(51) Int. Cl.
*A23L 13/60*      (2016.01)
*A23L 13/40*      (2023.01)
(Continued)

(52) U.S. Cl.
CPC ............. *A23L 13/67* (2016.08); *A23L 13/426* (2016.08); *A23L 13/428* (2016.08); *A23L 13/43* (2016.08);
(Continued)

(58) Field of Classification Search
CPC ...... A23L 13/67; A23L 13/426; A23L 13/428; A23L 13/43; A23L 33/17; A23L 33/22; A23L 33/115; A23L 33/40; A23P 30/20
See application file for complete search history.

(56) References Cited

U.S. PATENT DOCUMENTS

| | | | |
|---|---|---|---|
| 2016/0242450 A1* | 8/2016 | Magana .................. A23L 29/20 |
| 2022/0125072 A1* | 4/2022 | Ben-Shitrit ............. A23P 20/20 |

FOREIGN PATENT DOCUMENTS

| | | |
|---|---|---|
| AU | 2018412386 B2 | 5/2021 |
| CN | 108477545 A | 9/2018 |

(Continued)

OTHER PUBLICATIONS

Dick et al., "Feasibility study of hydrocolloid incorporated 3D printed pork as dysphagia food", Food Hydrocolloids, 107, Oct. 2020, 105940; Retrieved from Internet URL: https://doi.org/10.1016/j.foodhyd.2020.105940. (Year: 2020).*

(Continued)

*Primary Examiner* — Stephanie A Kohler
(74) *Attorney, Agent, or Firm* — Koivula & Somersalo LLC

(57)     ABSTRACT

The invention relates to food technology. Specifically, it discloses a 3D-printed high-protein and prebiotic dietary-fiber-rich finger food adapted to provide balanced nutrition for the elderly and people with swallowing disorders. By including lean meat (e.g., pork), prebiotic dietary-fibers-rich berry pomace, broth, collagen, structured oil as a bigel (biphasic system), salt and seasonings as main raw materials and through pureeing, blending, shaping by extrusion, baking, the 3D-printed product is rich in protein and prebiotic dietary fiber. Further, it is suitable for people with dysphagia, complying International Dysphagia Diet Standardization Initiative (IDDSI) level 6, which classifies the product as soft and bite-sized. The invention discloses a method s of producing such 3D-printed food products, from selecting and processing the initial ingredients to ready-to-eat products. The steps include preparing a nutritious formulation with properties suitable for 3D printing, 3D-printing, and heat-treating with specifically defined parameters.

12 Claims, 5 Drawing Sheets

(51) Int. Cl.

| | |
|---|---|
| *A23L 33/00* | (2016.01) |
| *A23L 33/115* | (2016.01) |
| *A23L 33/17* | (2016.01) |
| *A23L 33/22* | (2016.01) |
| *A23P 30/20* | (2016.01) |

(52) U.S. Cl.
  CPC ............. *A23L 33/115* (2016.08); *A23L 33/17*
    (2016.08); *A23L 33/22* (2016.08); *A23L 33/40*
                (2016.08); *A23P 30/20* (2016.08)

(56) References Cited

FOREIGN PATENT DOCUMENTS

| CN | 111789236 A | * | 10/2020 | ........... A23L 33/125 |
|---|---|---|---|---|
| WO | 2019169802 A1 | | 9/2019 | |
| WO | 2022093122 A1 | | 5/2022 | |

OTHER PUBLICATIONS

Agnieszka, PL 224756, Derwent Abstract, 2017. (Year: 2017).*
Augustin, Livia SA, et al. "Dietary fibre consensus from the international carbohydrate quality consortium (ICQC)." Nutrients 12.9 (2020): 2553.
Bahlinger, Eunike, et al. "Development of two specific multiplex qPCRs to determine amounts of Pseudomonas, Enterobacteriaceae, Brochothrix thermosphacta and *Staphylococcus* in meat and heat-treated meat products." International Journal of Food Microbiology 337 (2021): 108932.
Cunningham, Marla, et al. "Shaping the future of probiotics and prebiotics." Trends in microbiology 29.8 (2021): 667-685.
Delroisse, Jean-Marc, et al. "Quantification of *Bifidobacterium* spp. and *Lactobacillus* spp. in rat fecal samples by real-time PCR." Microbiological research 163.6 (2008): 663-670.
Dick, Arianna, et al. "Feasibility study of hydrocolloid incorporated 3D printed pork as dysphagia food." Food Hydrocolloids 107 (2020): 105940.
Dick, Arianna, Bhesh Bhandari, and Sangeeta Prakash. "Printability and textural assessment of modified-texture cooked beef pastes for dysphagia patients." Future Foods 3 (2021): 100006.
Gibson, Glenn R., et al. "Expert consensus document: The International Scientific Association for Probiotics and Prebiotics (ISAPP) consensus statement on the definition and scope of prebiotics." Nature reviews Gastroenterology & hepatology 14.8 (2017): 491-502.
Haarman, Monique, and Jan Knol. "Quantitative real-time PCR analysis of fecal *lactobacillus* species in infants receiving a prebiotic infant formula." Applied and environmental microbiology 72.4 (2006): 2359-2365.
Jansson, Therese, et al. "Chemical and proteolysis-derived changes during long-term storage of lactose-hydrolyzed ultrahigh-temperature (UHT) milk." Journal of agricultural and food chemistry 62.46 (2014): 11270-11278.
Juul, Filippa, Georgeta Vaidean, and Niyati Parekh. "Ultra-processed foods and cardiovascular diseases: potential mechanisms of action." Advances in Nutrition 12.5 (2021): 1673-1680.
Keerthana, K., et al. "Development of fiber-enriched 3D printed snacks from alternative foods: a study on button mushroom." Journal of Food Engineering 287 (2020): 110116.
Kelty, Catherine A., et al. "Distribution of genetic marker concentrations for fecal indicator bacteria in sewage and animal feces." Applied and Environmental Microbiology 78.12 (2012): 4225-4232.
Kouzani, Abbas Z., et al. "3D printing of food for people with swallowing difficulties." KnE Engineering (2017): 23-29.

* cited by examiner

| IDDSI testing | |
|---|---|
| Sample | Finger food beetroot-flavoured |
| Initial view | |
| Fork pressure test | |
| Spoon tilt test | |
| Fork separation test | |

Figure 2a

| IDDSI testing | |
|---|---|
| Sample | Finger food Tomato-flavoured |
| Initial view | |
| Fork pressure test | |
| Spoon tilt test | |
| Fork separation test | |

Figure 2b

| IDDSI testing | |
|---|---|
| Sample | Finger food meat-flavoured |
| Initial view | |
| Fork pressure test | |
| Spoon tilt test | |
| Fork separation test | |

Figure 2c

NUTRIENTS-DENSE 3D-PRINTED FOODS FOR THE ELDERLY AND PEOPLE WITH SWALLOWING DISORDERS

FIELD OF INVENTION

The invention relates to the field of food technology. More specifically, it is a 3D-printed high-protein and prebiotic dietary-fiber-rich finger food adapted to provide balanced nutrition for the elderly and people with swallowing disorders.

BACKGROUND ART

Dysphagia is a condition that affects a person's ability to swallow at the oropharyngeal and/or esophageal stages, slowing down the passage of a bolus of food from the oropharynx to the stomach. Elderly people who suffer from dysphagia are likely to reduce their dietary intake, which potentially results in malnutrition, weight loss, and nutritional deficiencies. The most common management of dysphagia is texture modification which refers to diets where the food is modified in such a way that the patient can safely swallow it. The tolerable texture of solid foods varies greatly according to the degree of dietary textural restrictions for dysphagia patients. The International Dysphagia Diet Standardization Initiative (IDDSI) Framework categorized solid foods into five IDDSI levels according to their consistency: liquidized (level 3), pureed (level 4), minced and moist (level 5), soft and bite-sized (level 6), and easy to chew/ regular (level 7) (The International Dysphagia Diet Standardization Initiative 2019).

Patients on a texture-modified diet typically have 17-37% lower energy intakes than those on conventional diets (Miles et al., 2020), resulting in malnutrition and potential immunosuppression. This happens for several reasons. Texture-modified food can become less palatable and nutrient-diluted due to additional liquids to achieve the desired consistency. Poor meal presentation, reduced meal selection, and patient eating difficulties make eating a burden, which reduces the appetite of many patients. The lower nutritional value of modified-texture food is also determined by some technological factors. In general, foods undergo heat treatment and dilution in a high volume for texture adjustment. This results in a considerable decrease of minerals and water-soluble vitamins through leaching and/or degradation. Therefore, even dysphagia patients who seem to eat a sufficient amount of food receive significantly lower amounts of micronutrients with it. In addition, the diet of dysphagia patients usually consists of various food purees, where it is difficult to ensure a uniform and correct texture due to variations in raw materials and applied processes. Therefore, to ensure the suitability of food for a dysphagia patient, it is necessary to evaluate its texture after cooking using IDDSI methods (Kouzani).

In recent years, 3D-printing has received several approvals as a suitable tool for texture-modified foods for dysphagia patients. The benefits of this technology are making texture-modified food that is more appetizing and a large variety of it. This is especially important when preparing not only main dishes but also snacks since nutritional experts agree that snacking between meals is an excellent way to acquire extra nutrients and enhance oral intake (Volkert et al., 2019). There are few studies indicating that the 3D-printing technique has the potential to develop 3D products with more attractive sensory properties than unprinted products. Keerthana et al (2020) 3D-printed mushroom fiber-enriched snacks with high sensory acceptability. Liu et al (2018) showed that mashed potatoes/strawberry juice gel can be used for the 3D-printing of extremely attractive multi-material structures with increased complex shapes and good appearance. In another study Liu et al (2018) used fibrous meat (chicken, pork, and fish with gelatin powder) for the 3D-printing of attractive food patterns and shapes, making food more eye-catching.

One of the most significant advantages of 3D-food printing is the accurately predicted consistency of the printed product. For example, Kouzani et al. (2017) have created texture-modified 3D-printed tuna, pumpkin, and beetroot puree with constant texture for patients with dysphagia. Pant et al. (2021) used fresh bok choy, garden peas, and carrots in 3D-printed products for the elderly with dysphagia and other swallowing disorders. 3D-printed pork and beef pastes were created as modified-texture foods for varying levels of dysphagia (Dick, et al, 2020; Dick, et al, 2021) by using a thermal process as post-processing to modulate the texture of the 3D-printed product. According to the European Society for Clinical Nutrition and Metabolism (ESPEN) guidelines, oral intake of a safe texture should be promoted to the greatest extent feasible (Volkert et al., 2019) The fact that printed food product is almost always of the right texture significantly reduces the risk of fatal choking and aspiration pneumonia in patients with dysphagia. By reducing the possibility of human error in the preparation of texture-modified foods with the incorrect texture or composition, 3D-printed food is safer.

Regardless of the listed advantages, 3D-printed foods that have been specifically produced for dysphagia patents are not yet very common. There are several negative aspects of 3D-printed dysphagia-friendly foods:

1) 3D-printing technology requires intensive processing (mashing, pureeing, sieving, cooking, freeze-drying, extruding), and that negatively affects the nutritional status of 3D-printed food. Therefore, it is important to pay special attention not only to the nutrients content but also to the digestibility and bioavailability of the nutrients which is affected by the processing;

2) High levels of ultra-processed foods in the dysphagia diet, like 3D-printed foods, can lead to problems in the gut microbiome (Juul). Due to the lack of whole grain products and dietary fiber in 3D-printed food, the diversity of the intestinal microbiota of consumers decreases, the number of harmful microorganisms increases, and the modulation of the immune system occurs. This results in inflammation.

3) One more cause that 3D-printed products can become less palatable may be the use of hydrocolloids, which make it possible to print formulations with high water content. However, food hydrocolloids can impart a non-natural flavor to the food, leading to lower consumer acceptance (Pant et al., 2021).

The present invention solves the above-listed problems by composing a 3D-food-printing suitable formulation with high nutritional status containing a high amount of proteins and prebiotic fibers, which enables to get attractive on-bite snacks suitable for people with swallowing disorders.

Some dietary fibers not only have positive health effects related to reducing the risk of chronic diseases, but also act as prebiotics by being a substrate for the fermentation of potentially beneficial bacteria in the gastrointestinal tract, thus influencing the composition and metabolism of bacterial communities (Lordan, Thapa, Ross, & Cotter, 2020). Food and nutrition experts agree on the importance of dietary fiber intake for gut microbiota balance (Gibson, &

Rastall, 2019). But not all dietary fiber corresponds to the concept of prebiotics. Currently, there is sufficient knowledge in the literature about the prebiotic action of resistant oligosaccharides-fructans (fructooligosaccharides, oligofructose, and inulin) and galactans (Lordan et al., 2020). Meanwhile, polydextrose, pectin, and resistant starch are treated as having prebiotic potential (Rezende, Lima, & Naves, 2021). There is evidence that the interaction of dietary fiber with other components of the food matrix, especially phenolic compounds, modulates the gut microbiota more effectively than the consumption of purified commercial fibers (Augustin et al., 2020). Therefore, in our opinion, 3D-printed food products should not contain purified commercial fibers, but berry pomace, which is rich in dietary fiber and phenolic compounds. Since there is currently no evidence of prebiotic activity of berry pomace, it is necessary to prove it. In this way, the berry pomace would perform several functions in 3D-printed food products, i.e.

1) modify the texture of the product without adding thickeners,
2) provide the product color and additional taste,
3) contribute to the positive effect on the intestinal microbiota of consumers.

According to the object of the invention, the closest patent documents to the present invention are global application WO2022/093122A1 of the priority date of Oct. 26, 2020, extended to various countries, global application WO2019169802 and other patents of this family (China patent CN108477545, Australian patent AU2018412386) and China patent CN111789236A of Oct. 20, 2020. These patent documents describe 3D-printed food for people with dysphagia, where 3D-printable plant-based or fish-based ink contain one or more hydrocolloids to regulate the rheological properties and extrusion effect of the ink and obtain 3D-printed food suitable for people with different dysphagia levels.

The application WO2022/093122A1 discloses, in the first aspect, an edible and 3D-printable plant-based ink composition for consumption by dysphagic patients, the edible and 3D-printable plant-based composition includes:

a vegetable puree and/or a fruit puree, where the vegetable puree and the fruit puree are not freeze-dried and contain one or more hydrocolloids; or
a vegetable puree and/or a fruit puree, wherein the vegetable puree and the fruit puree are not freeze-dried;
wherein each of one or more hydrocolloids is present in an amount of 10 wt % or less based on the vegetable puree and/or the fruit puree.

In another aspect, WO2022/093122A1 discloses a method of forming the edible and 3D-printable plant-based ink composition described in various embodiments of the first aspect, comprising steps:

providing a puree of a vegetable and/or fruit;
sieving the puree to remove any solid particles which block a nozzle of a 3D printer; and
cooling the puree to room temperature for 3D-printing.

The application WO2019169802 discloses a method of accurate 3D-printing of food, for easy-to-swallow dual-color mashed potato/mashed purple sweet potato cold dish. According to the method, fresh potatoes and purple sweet potatoes are cleaned, skinned, sliced, steamed, boil, and mashed. Additives of 1% to 2% xanthan gum and 2% to 3% calcium-sensitive pectin are added to the mashed potatoes and purple sweet potatoes, to adjust the material viscosity and cohesion. After cooling down to room temperature, an appropriate amount of seasoning/honey, and olive oil are added into the mashed purple-sweet potato. After adding xanthan gum and pectin, the viscosity of the mashed potatoes and mashed purple potatoes is $1-1.5\times10^3 J/m^3$, and the cohesion is 0.2-0.6. For the dual-color, the 3D-printing parameters are set as follows: nozzle diameter: 0.8 mm; normal printing speed is 20-25 mm/s, for the first layer the printing speed is 45% to 50% of the normal printing speed, and the printing speed of the two layers on the surface of the object is 35% to 45% of the normal printing speed; the relative position of the second nozzle to the first nozzle is X-66.5 mm, Y-0.8 mm; the filling ratio is 40% to 70%, and the filling mode is Rectilinear or Honeycomb. The method in the present application may better guarantee a normal nutrition supply and safety in eating and swallowing for elderly people.

The Chinese patent application CN111789236A discloses a 3D-printed food with fish as raw materials and suitable for special crowds. By adjusting the ratios of fish paste to different hydrophilic colloids, the purpose of directionally and accurately regulating the rheological property and the extrusion effect of the materials is achieved, and the food suitable for people with different dysphagia levels can be prepared according to the needs of consumers. The hydrophilic colloid includes carrageenan, xanthan gum, and guar gum; the mass ratio of carrageenan, xanthan gum, and guar gum is (0~0.001):(0.005~0.02):(0.005~0.02). Sea cucumber polysaccharide is embedded with a W/O/W multiple emulsion adjuvant and serves as a functional factor to be added into the 3D-printed food so that the 3D-printed food has the functions of resisting viruses and tumors and improving immunity. 3D printing has a nozzle diameter of 0.8-1.5 mm, and printing speed of 20-30 mm/s, and a printing temperature of 20-25° C.

However, these disclosures do not reveal the nutritional status of these food products and what is their digestibility. Different food components such as proteins, fats, and carbohydrates are digested in different phases of the gastrointestinal tract, and the majority of nutrients are properly absorbed by the body while they are released in the small intestine, while dietary fiber has an effect on the gastrointestinal tract health and microbiota modulation.

The present invention emphasizes a lack of food products and/or product groups that would:

have an attractive appearance—bite-size, easy to pick up by fingers and transport to the mouth, colors—bright, noticeable, taste and smell-expressive, fresh;
include a balanced diet of nutrients appropriate for human consumption, in particular, for the elderly and patients for whom a complete balanced diet with a positive effect on the gastrointestinal tract health is essential;
the product would be easy to swallow and have a viscosity being optimal for feeding the elderly and patients with mild or more severe swallowing disorders (dysphagia).

SUMMARY OF INVENTION

The present invention discloses a method for 3D-printing-suitable formulation (mixture prepared according to a particular formula/composition) that provides enough nutrients, good gastrointestinal health, and tolerable texture to meet the needs of elderly people with dysphagia. By including the initial ingredients, as the main raw materials lean meat, for example, lean pork,
prebiotic dietary-fibers-rich berry pomace, as a source of dietary fiber,
water or/and broth,
collagen,
vegetable oil, structured as a bigel (biphasic system), seasonings providing the product the taste, aroma, and
color, salt, and applying the processing steps of pureeing, blending, shaping by extrusion, preferably 3D-printing, and baking, the obtained 3D-printed product is rich in protein and
prebiotic dietary fiber. Also, the obtained product has
the textural characteristics of IDDSI (International
Dysphagia Diet Standardization Initiative) level 6 (soft
and bite-sized), so the food is suitable for the elderly
with weakened chewing and swallowing functions.

The nutritional composition and texture of the formula-
tion suitable for 3D-printing of foods comprise:

52.0-59.0 g/100 g of water;

23.0-25.0 g/100 g of meat proteins;

6.0-6.5 g/100 g of vegetable oil;

3.0-4.0 g/100 g prebiotic dietary fibers.

The present invention, in one aspect, discloses a struc-
tured formulation of selected food components, which is
suitable for food 3D-printing, thereby allowing to 3D-print
soft texture and bite-sized finger foods with good nutritional
status and positive effect on gastrointestinal tract health. A
high amount of proteins with good digestibility, dietary-
fibers-rich berry pomace with prebiotic properties, and
structured oil, incorporated into protein hydrogel, further
ensures good 3D-printability and extrusion properties of the
formulation.

The prebiotic potential of dietary-fibers-rich berry pom-
ace was investigated in vitro for their impact on the abun-
dance of *Lactobacillus plantarum, Lactobacillus reuteri,*
and *Lactobacillus paracasei.* The potential beneficial effects
of dietary fiber-rich berry pomace in the intestinal micro-
biota were evaluated by the changes in microbiota compo-
sition in the gut. The kinetics of protein digestion was
investigated during the in vitro digestive degradation of the
3D-printed foods. Simulated gastrointestinal activity is used
in many areas of the food and nutrition sciences because
human testing is often expensive, resource-intensive, and
ethically controversial. In the development of foods for
elderly consumers, in vitro digestive degradation is essential
to assess the properties of the product up to the final phase
of its assimilation by the body.

The present invention solves problems and obtains the
following effects:

due to many factors, nutritional intake is often compro-
mised in older persons and the risk of malnutrition is
increased. The solution is: to offer elderly people
in-between meals the nutrients dense 3D-printed food
because its development considers changes in appetite,
taste perception, swallowing, and nutrient needs in old
age;

risk of fatal choking and aspiration pneumonia in elderly
with dysphagia due to inappropriate food consistency.
By using the 3D-printing technique, it is possible to
accurately predict the consistency of the printed prod-
uct, reduce the possibility of human error, and get food
products with almost always the right texture;

the digestibility of the nutrients is affected by the intensive
processing of food and that has a negative impact on the
nutritional status of 3D-printed food. Therefore, special
attention is paid not only to the nutrient content but also
to the digestive degradation of the developed
3D-printed foods.

using ultra-processed foods in the elderly diet, like
3D-printed foods, can lead to problems in the gut
microbiome. By adding to the developed 3D-printed
food the dietary-fiber-rich berry pomace, which can
serve as a prebiotic, it is possible to get a positive effect
on the gastrointestinal tract health of the elderly.

The product due to its small (bite) size, and different
colours, is convenient to use, provides individualized
daily norms, and allows monitoring consumption by
patients of the product.

the product includes a predefined amount of prebiotic
dietary fiber, more specifically, obtained from berry
pomaces, thereby providing additional advantageous
nutritional effects.

DESCRIPTION OF DRAWINGS

The invention is explained in the drawings and diagrams.
The drawings are provided as a reference to possible
embodiments and experimental results and are not intended
to limit the scope of the invention.

FIG. 1a
shows graphs of 5 bacterial populations (*Lactobacillus,
Prevotella, L. reuteri, Baceroides,* and *Bifidobacterium*)
increase.

FIGS. 2a, b and c depict testing results of different
3D-printed foods according to IDDSI (International
Dysphagia Diet Standardization Initiative) framework: 2a
Finger food beetroot-flavored; 2b Finger food Tomato-fla-
voured; 2c Finger food meat-flavored.

FIGS. 3a and 3b show the bite-size products, having differ-
ent shapes and several layers printed by the nutritious
formulation line extruded from the 3D printer, thereby,
forming a 3D-shape of the product.

DETAILED DESCRIPTION OF INVENTION

Figure 1A:
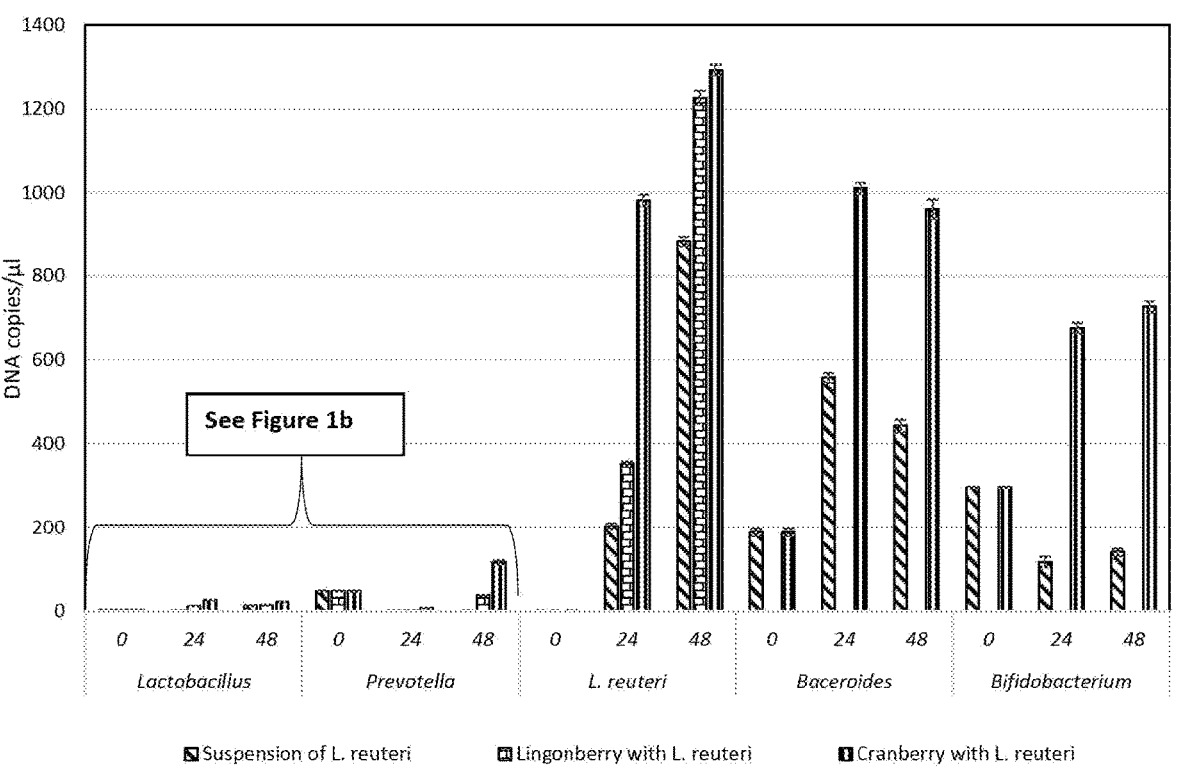
FIGS. 1a and b depict changes in the bacterial populations
measured during in vitro colonic fermentation of dried
dietary-fiber-rich berry pomace inoculated with probiotic *L.
reuteri* were also measured. During 48 hours of fermenta-
tion, an increase in the *L. reuteri* observed in the lingonberry
and cranberry pomace media was considerably higher than
in that with no dried berry pomace in the medium.

The description discloses high-protein and dietary-fiber-
rich formulations (mixture prepared according to a particular
formula) suitable for the 3D-printing of foods, and the
3D-printed foods adapted to provide balanced nutrition for
the elderly and people with swallowing disorders.

The nutritional composition and texture of the formula-
tion suitable for 3D-printing of foods comprise:

52.0-59.0 g/100 g of water;

23.0-25.0 g/100 g of meat proteins;

6.0-6.5 g/100 g of vegetable oil;

3.0-4.0 g/100 g prebiotic dietary fibers.

The consistency of the 3D-printed products corresponds
to level 6 (soft and bite-sized) according to International
Dysphagia Diet Standardization Initiative (IDDSI) Frame-
work.

Components of the formulation suitable for 3D-printing
of foods. The components and their amounts listed below
compose one of the possible product embodiments devel-
oped and tested in the laboratory. However, the following
components and their amounts do not limit the present
invention, both in terms of the content of the materials and
the proportions of the composition:

lean meat, preferably, pork (34-35 g/100 g); other meat types can be used;

water or broth (39-44 g/100 g);

collagen (2-3 g/100 g);

structured vegetable oil as a bigel system (15-16 g/100 g). The bigel system, preferably, contains hydrogel and oleogel phases mixed at a ratio of 1:3 (w/w). The Hydrogel phase contains collagen (45%, w/w) and water. Oleogel contain vegetable oil mixed with emulsifier E471 (1%, w/w);

seasonings, that give the product the taste, aroma, and color of beetroot, tomatoes, and meat (1-2 g/100 g);

sodium chloride (salt) (up to 1 g/100 g);

fresh or defrosted berry pomace for the prebiotic dietary fiber (4-5 g/100 g).

Preparation of 3D-printed high-protein and prebiotic dietary-fiber-rich food comprises stages of:

preparation of raw materials, preparation of structured oil as bigel (bigel system), making formulation for 3D-printing by blending all ingredients, shaping a bite-sized product by 3D-printing, post-processing, such as thermal treatment, for example, heating meat ingredients up to 74° C.;

packaging and storage.

More specifically, the steps of the 3D-food preparation are described as follows:

1. Preparing raw materials. The raw materials are lean meat, preferably, lean pork, which is:

cooked in water, cooled to room temperature, and minced using a 0.2 mm sieve;

the broth is cooled.

Other types of meat or mixtures thereof can be prepared in the same way. If immediate usage of the above-prepared meat is not available, it should be frozen and stored in sealed packages at −18° C. The broth is also stored in the refrigerator until further use.

2. Preparing structured oil as a bigel. The bigel structure is formulated by hot emulsification after prior separate preparation of the hydrogel and oleogel phases. For the hydrogel phase preparation, collagen (45%, w/w) and water are weighted and mixed. The Oleogel phase is prepared by mixing emulsifier E471 (1%, w/w) and oil. Both phases are heat treated at 85° C. temperature for 30 minutes by constantly mixing. After that, oleogel is gently mixed with hydrogel at a ratio of 1:3 (w/w), and both phases are emulsified with rotor-stator homogenizer for 2-3 min at 15 000 rpm (temperature −85° C.). Immediately after preparation, the system is cooled down to 0-2° C. temperature and stored in sealed packages at 4 C for up to 15 days.

3. Preparing prebiotic dietary fibers. Fresh or defrosted berry pomace is dried to a moisture content of 7-9% by using various drying methods—hot air (35-40° C., 48-72 hours), freeze-drying (−50° C., 0.5 mbar, 24-48 hours).

The dried pomace is cooled, weighed, and stored in sealed packages in a well-ventilated room with a relative humidity of no higher than 75% and an ambient temperature not exceeding 20° C. up to 4 months, or refrigerated at 4° C. up to 12 months. Before usage dry pomace is milled to 0.2-0.25 mm particles.

4. Making formulation for 3D-printing by blending all ingredients in a certain order. Minced lean pork (34-35% (w/w)), broth (39-44% (w/w)), prebiotic dietary fibers (4-5% (w/w)), collagen (2-3% (w/w)), salt, and seasonings that give the product the taste, aroma, and color of beetroot, tomatoes and meat (1-2% (w/w)), are blended for 3 minutes. After that, the bigel is added and gently blended for 1 minute.

5. Shaping by performing 3D printing. The main parameters of 3D printing: nozzle diameter—3.9-4.1 mm, print speed—13900-14100 mm/min, line thickness—3.2-3.6 mm, and printing temperature—20-25° C. The customized design of the objects was cylindrical shape (28-32 mm diameter×9-11 mm) with the size of one bite.

6. Baking. The 3D-printed food product is heat treated until the temperature in the center of the product is 70-74° C. no longer than 5 min.

The baked food is suitable for eating or cold storage.

Characteristics of the 3D-printed foods. The following characteristics of prebiotic dietary fibers were examined:

The prebiotic activity of dietary-fibers-rich berry pomace;

Prebiotic effects of dietary-fibers-rich berry pomace on the human colonic microbiota.

The Prebiotic activity of dietary-fibers-rich berry pomace. Prebiotic activity (PA), reflects the ability of a given substrate to support the growth of an organism relative to other organisms and relative to growth on a non-prebiotic substrate, such as glucose. Therefore, dietary fibers containing carbohydrates can have a positive prebiotic activity score if they are metabolized as well as glucose by probiotic strains and are selectively metabolized by probiotics but not by other intestinal bacteria. The assay was performed according to Huebner et al. (2007) by adding 1% (vol/vol) of an overnight culture of each probiotic strain (*Lactobacillus plantarum* F1, *Lactobacillus reuteri* 182 or *Lactobacillus paracasei* subsp. *paracasei* ATCC® BAA-52) to separate tubes containing MRS Broth with 1% (wt/vol) glucose or 1% (wt/vol) berry pomace or inulin (known as prebiotic and used as control). The cultures were incubated at 37° C. at ambient atmosphere. After 0 and 24 h of incubation, samples were enumerated on De Man, Rogosa, and Sharpe agar (Liofilchelm). In addition, overnight *E. coli* ATCC 25922 bacteria were added at 1% (vol/vol) to separate tubes containing M9 broth with 1% (wt/vol) glucose or 1% (wt/vol) prebiotic. The cultures were incubated at 37° C. at ambient atmosphere, and enumerated on Plate Count Agar (PCA, Liofilchelm) after 0 and 24 h of incubation. Each assay was replicated three times. The prebiotic activity score was determined using the following equation:

$$PA = \left[ \frac{(\text{Probiotic } \lg CFU/\text{ml on the prebiotic at 24 h} - \text{Probiotic } \lg \quad CFU/\text{ml on the prebiotic at 0 h})}{(\text{Probiotic } \lg CFU/\text{ml on the glucose at 24 h} - \text{Probiotic } \lg CFU/\text{ml on the glucose at 0 h})} \right] -$$

$$\left[ \frac{(E. \ coli \ \lg CFU/\text{ml on the prebiotic at 24 h} - E. \ coli \ \lg CFU/\text{ml on the prebiotic at 0 h})}{(E. \ coli \ \lg CFU/\text{ml on the glucose at 24 h} - E. \ coli \ \lg CFU/\text{ml on the glucose at 0 h})} \right]$$

Prebiotic effects of dietary-fibers-rich berry pomace on the human colonic microbiota. The assay was performed in the simulator of the human intestinal microbial ecosystem (SHIME®) according to the protocol of ProDigest (Belgium). The SHIME model was run to simulate the stomach, small intestine, and colonic parts using controlled conditions. Sterilized 5 grams of dietary-fibers-rich berry pomace was diluted to sterile distilled water before adding it to the stomach vessel. The SHIME model was inoculated with fecal microbiota from healthy adult volunteers in the simulated colonic vessel. The samples were collected from the colonic vessel before dietary-fibers-rich berry pomace transfer (0 h) and 24; 48 h of dietary-fibers-rich berry pomace digestion in the colon vessel.

Total DNA was extracted from collected samples using PureLink™ Microbiome DNA Purification Kit and eluted in a final volume of 1000 copies/µl, and then tested in qPCR assays for specific bacterial 16 S rRNA genes. The samples were subjected to quantification of *Bifidobacterium* spp., (Delroisse et al. 2006), *Clostridium* spp., (Kelty et al., 2012), *Bacteroides* spp., (Layton et al, 2006), *Lactobacillus* spp., (Haarman and Knol, 2006). *Enterobacter* spp. (Bahlinger et al., 2021) and *Prevotella* spp. (Sedighi et al., 2017) by qPCR method. All qPCR reactions were performed on a Quant-Studio Absolute Q Digital PCR System (Applied Biosystems, Singapore).

Characteristics of the formulation suitable for 3D-printing of foods. The following physicochemical characteristics of the formulation suitable for the 3D-printing of foods were examined:

pH,
water holding capacity,
rheological properties,
printability.

The preferred characteristic ranges are, for pH 5,6-5,9, for WHC 99-100%. Rheological characteristics are not provided, as they depend on an estimation method applied and how they are estimated. Also, printability characteristics are defined: printing stability 95-99%, printing accuracy 95-99%, stability after printing, and stability after heat-treatment 85-99%.

The pH was measured directly in pork samples by using a WTW digital pH meter 3110 (WTW, Weilheim, Germany) with penetrating probe N 1048A.

For the determination of water holding capacity (WHC), 5 grams of the formulation was weighed into a centrifuge tube and centrifuged for 10 minutes at 10000 rpm. Immediately after centrifugation, the supernatant was carefully removed. Samples were re-weighed and the WHC was calculated as follows:

$$WHC\ (\%) = \frac{initial\ weight - final\ weight}{initial\ weight} \times 100$$

Rheological characteristics were evaluated by shear sweep and frequency sweep tests at 25° C. using a rheometer with a plate-to-plate system (diameter 20 mm, gap 2 mm).

The flow behaviour was estimated over a shear ranging from 0.01 to 5/s. Data were analyzed using the Herschel-Bulkley model, and the viscosity coefficient (K), and flow index (n) were calculated.

The limit of the linear viscoelastic (LVE) area was confirmed by the amplitude sweep test, before the frequency sweep test, and the shear strain value of 0.1% was determined for the LVE region. In the frequency sweep test, the storage (G') and loss moduli (G') were measured, and the angular frequency was changed from 0.1 to 100 rad/s at 25° C.

Printability was evaluated by the printing stability, the printing accuracy, stability after printing, and stability after heat treatment. Electronic Caliper Ali 19370 150 mm (Suwmiarka Elektroniczna, Poland) was used for measurements. In all cases, the height of the printed samples was evaluated immediately after printing, 2 hours after printing, and after heat treatment, three repetitions were performed. Indices were calculated according to the formulas:

$$Accuracy\ of\ printability = \left(1 - \frac{|H0 - H|}{H}\right) * 100, \%$$

$$Printing\ stability = \left(1 - \frac{|H2 - H0|}{H0}\right) * 100, \%$$

$$The\ change\ in\ height\ after\ heat\ treatment = \left(1 - \frac{|Ht - H0|}{H0}\right) * 100, \%$$

where: H—the height of the product set in the software; H0—product height immediately after printing; H2—product height 2 hours after printing; Ht—product height after heat treatment.

Characteristics of the 3D-printing and heat-treated foods. For the characterization of 3D-printed and heat-treated foods, they were prepared with three categories of seasonings and flavourings: beetroot-flavoured, meat-flavoured, and tomato-flavoured. The following characteristics of the 3D-printing and heat-treated foods were examined:

texture profile,
IDDSI level,
sensory characteristics.

Texture profile analysis (TPA) was performed on a texture analyser (TA.XT Plus, Stable Microsystem Ltd, Godalming, UK). The P/10 10 mm diameter cylinder Perspex probe had a pre-test speed of 1.7 mm/s, a test and return speed of 2.5 mm/s, and a target distance and duration between cycles of 4 mm and 5 s, respectively. Two sub-sampling units were tested and averaged per replicate to record the hardness, cohesiveness, and adhesiveness values.

IDDSI testing methods were carried out to categorise the samples within the IDDSI level 6, corresponding to soft and bite-sized (The International Dysphagia Diet Standardisation Initiative 2019). The fork pressure test and spoon pressure test were employed. When testing the soft and bite-sized category, 1.5 cm×1.5 cm testers were cut from the 3D-printed samples.

Sensory evaluation was carried out in Kaunas Hospital of the Lithuanian University of Health Sciences. Participants were eligible if they were 60 years old or over. Participants were excluded if they were allergic or intolerant to one of the foods of the study if they have severe dementia (i.e. MMSE test<10), with marked respiratory failure, clear gastrointestinal pathology (exacerbation of ulcers, diarrhea, nausea, severe dysphagia with a high risk of aspiration). The sample size was calculated to detect a difference of 0.8 on the 7-point scale. Considering an average Standard Deviation (SD) of 1.6 liking score in older people (Sulmont-Rosse et al., 2018), a minimum of 51 participants was required (power=0.80; α=0.05).

Participants took part in one individual session at the time from 10:00 to 13:00. Participants were served three products in a monadic sequence. The presentation order of the products was balanced across participants. Products were served at room temperature on a plate: all the products were presented in cylindric form (12 g per product. Participants were informed that they will taste beetroot-flavoured, meat-flavoured, and tomato-flavoured products. But they were not informed about the process, used for processing (3D-printing technology) and the nutritional information of the products. For each product, participants were asked to taste it and to complete a questionnaire including nine questions on liking, comfort, and texture. For each question, participants were asked to answer on a 7-point categorical scale labeled at each anchor. Questions were the following:

This product is? . . . —"Difficult to handle by hand"/"Easy to handle by hand";

How much do you like the colour/the feeling in the mouth?—"I totally dislike"/"I totally like";

The taste and aroma of this products is? . . . —"Weak"/"Strong";

This product is? . . . —"Soft"/"Firm";

This product is? . . . —"Dry/Juicy";

This product is? . . . —"Difficult to swallow"/"Easy to swallow";

The aftertaste of the product during swallowing is? . . . —"Weak"/"Strong" and "Not mouth couting"/"Very mouth couting";

Do you have any comments (positive or negative) or suggestions regarding the product?;

If these nutritious products would be provided by the hospital would you be ready to consume them? . . . —"Not at all"/"Yes, definitely";

How often? . . . —"Never"/"1 to 3 times a week"/"Every two days"/"Once a day"/"Several times a day";

What are the best two shapes for evaluated products?— "Heart"/"Cylinder"/"Star"/"Mushroom"

After each product, participants were asked to rinse their mouths with plain water. The tasting session was carried out at a hospital ward or meeting room of each institution.

Imitating digestion of the 3D-printed product. Simulated in vitro digestion was performed with the prepared 3D-printed foods to evaluate the digestibility of proteins. As a control, minced and heat-treated lean pork was used. The study was performed according to the static in vitro digestion protocol Infogest. Three test tubes were used to obtain the digestion profile, and in them, the digestion process was stopped after 5 and 120 minutes in the gastric phase (G5 and G120), and 240 minutes in the intestinal phase (D120), respectively. Gastric phase samples were neutralized to pH 7.0±0.1, and the digestive process of intestinal phase samples was stopped by cooling in ice water to 0-4° C. After the reaction was stopped, the samples were centrifuged at 4000 rpm. in +4° C. temperature and filtered. The soluble digestive fraction was collected, frozen, and stored at −18° C. until analysis. The digestion procedure was performed twice. The digestibility of proteins was evaluated by the degree of protein hydrolysis. For that purpose, the level of free α-amino groups was determined following the method of Jansson et al. (2014). This involved 75 μL of protein sample being mixed with 75 μL of 24% trichloroacetic acid and centrifuged (17049×g at 4° C. for 20 min) after 30 min. The supernatant (30 μL) was added to 900 μL of 0.1 M borate buffer (pH 8.0) and 300 μL of fluorescamine solution (0.2 mg/mL fluorescamine in water-free acetone), and 250 μL was then transferred to each well in a microtiter plate. The analysis was conducted on a FLUOstar Omega microplate reader (BMG LABTECH, Germany) with excitation at 390 nm and emission at 480 nm. Quantification was achieved by calculating leucine equivalents using an external leucine standard curve. The degree of protein hydrolysis was calculated using the following equation:

$$DH_{protein} = \frac{h}{h_{tot}} \times 100\% \qquad (1)$$

where h is the amount of N-terminal amine at each time point of in vitro digestion and $h_{tot}$ is the total amount of N-terminal amine determined after full hydrolysis with HCl.

Statistical analysis. All analyses were carried out in triplicate. The results are presented as the mean±standard deviation. A p-value of <0.05 was used to indicate significant differences between the mean values determined by an analysis of variance (ANOVA) using Statistica 12.0 (StatSoft, Inc., Oklahoma, AK, USA, 2013). For sensory evaluation, scores were submitted to the ANOVA with product, gender, and dysphagia (yes/no) as fixed factors and participants as random factor. Interactions were removed from the model as they were found to be not significant.

Results. The ability of dried berry pomace to serve as prebiotics is described in several aspects: prebiotic activity score and effect on the human colonic microbiota. Quantitatively, the prebiotic index of different probiotics paired with various dried berry pomace or commercial prebiotic inulin (used as a control) varied with the strains of organisms tested. Results are presented in Table 1. The highest values of prebiotic activity scores were reported to black currants pomace and cranberry pomace on *L. plantarum* (1.790±0.055 and 1.714±0.035 respectively). The lowest PA scores were indicated for lingonberry pomace. However, among all of the probiotics grown in a medium supplemented with lingonberry pomace, the highest PA score (0.436±0.006) was attained by *L. reuteri* and this score was higher than for cells grown with inulin (0.193±0.003). It is very important that the PA scores of all tested dried berry pomace on *L.reuteri*, *L. plantarum*, and *L. paracasei* were higher than that of commercial prebiotic inulin, indicating the assumptive prebiotic effect of dried berry pomace.

TABLE 1

| Prebiotic activity score of dried berry pomace. | | | |
|---|---|---|---|
| | Prebiotic index for different probiotics grown with dried berry pomace | | |
| Dried berry pomace | *L. reuteri* | *L. plantarum* | *L. paracasei* |
| Lingonberry | 0.436 ± 0.006 | 0.689 ± 0.021 | 0.512 ± 0.012 |
| Cranberry | 1.472 ± 0.002 | 1.714 ± 0.035 | 1.552 ± 0.002 |
| Sea buckthorn | 1.513 ± 0.005 | 1.594 ± 0.003 | 1.480 ± 0.018 |
| Black currants | 1.612 ± 0.009 | 1.790 ± 0.055 | 1.563 ± 0.010 |
| Inulin | 0.193 ± 0.003 | 0.103 ± 0.022 | 0.289 ± 0.008 |

Figure 1B:
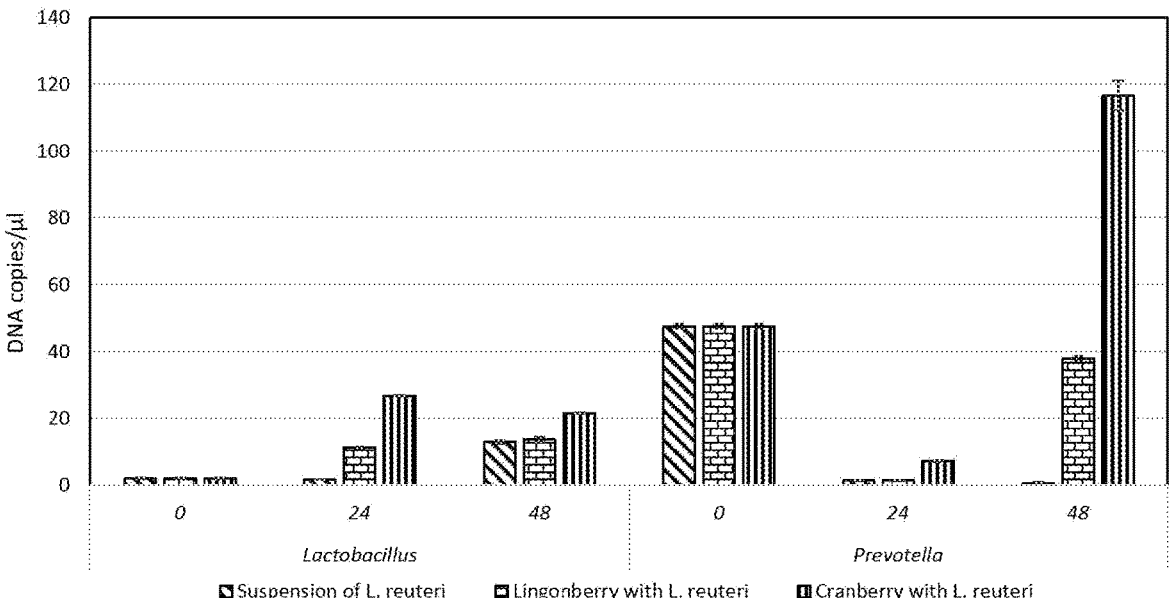
FIG. 1b shows the scaled graphs of *Lactobacillus*
and *Prevotella* populations increase.
Figure 3A:
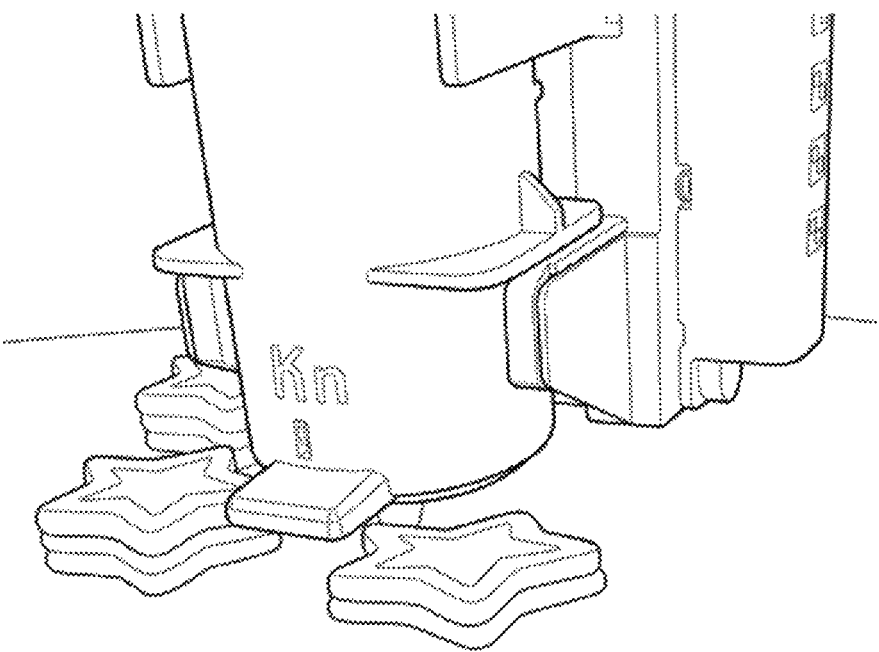
FIGS. 3a and b depict 3D-printing of the food products.
Figure 3B:
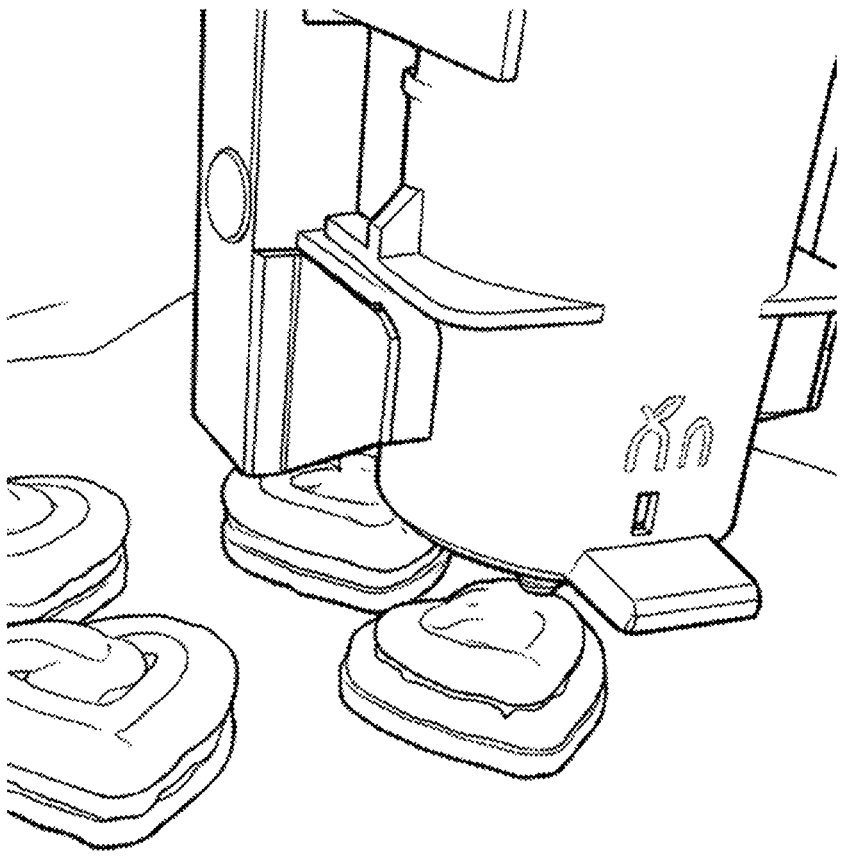

Changes in the bacterial populations measured during in vitro colonic fermentation of dried dietary-fiber-rich berry pomace inoculated with probiotic *L. reuteri* were also measured. During 48 hours of fermentation, an increase in the *L. reuteri* observed in the lingonberry and cranberry pomace media was considerably higher than in that with no dried berry pomace in the medium (FIG. 1). This proves the positive influence of berry pomace on the survival of *L. reuteri* cells during digestion in the stomach and intestine and their viability in the colon. The increase in *Bifidobacterium* and *Lactobacillus* was also registered during colonic fermentation when lingonberry and cranberry pomace inoculated with probiotic *L. reuteri* was added to the medium. This result is of particular importance because *Lactobacillus* and *Bifidobacterium* are the main targets of prebiotics in the gut microbiota (Gibson et al., 2017) and are related to several beneficial effects on human gut health (Cunningham et al., 2021). At the same time, the decrease in *Bacteroides* and *Bacteroides-Prevotella* was detected during the colonic fermentation with *L. reuteri cells alone in the*

*medium. On the contrary, increases in Bacteroides* and *Bacteroides-Prevotella* were observed at the end of the colonic fermentation (48 h) for dietary-fiber-rich berry pomace inoculated with *L. reuteri*. According to Hassan & Milton (2021) among dominant beneficial bacteria, there are several species of *Bacteroides*, which metabolize polysaccharides and oligosaccharides, providing nutrition and vitamins to the host and other intestinal microbial residents. *Bacteroides-Prevotella* species have been correlated with plant-rich diets, abundant in carbohydrates and fibers (Precup & Vodnar, 2019). According to our results, we can reasonably say that dried dietary-fiber-rich berry pomace has a prebiotic effect and a positive effect on the gut microbiota, therefore we can call them prebiotic dietary fiber.

To use the formulations containing high amounts of proteins and dietary fibers for the 3D-printing pH, water holding capacity, and rheological properties of these formulations were examined (Table 2). The protein amount in the formulations varied from 23±0.1 g/100 g to 25±0.1 g/100 g and dietary fiber content varied from 3.0±0.1 g/100 g to 4.0±0.1 g/100 g. Changes in the composition of formulations caused no significant changes in pH and WHC. Apparent viscosity increased with increasing protein and dietary fiber content. The highest viscosity was registered for the formulation containing 25±0.1 g/100 g of protein and 4.0±0.1 g/100 g of dietary fiber. The same tendencies were recorded for the viscoelastic properties of the formulation. Storage modulus G' represents the stored deformation energy and loss modulus G" shows the deformation energy dissipated through internal friction when flowing. This means that G' describes the sample's solid-state behavior, and G" shows its liquid state behavior. The ratio G':G"=5:1 to 10:1 is found for most samples, indicating the formation of three-dimensional networks. The Herschel-Bulkley equation was adjusted to the rheological behavior of the samples. This model fitted well to the shear stress and shear rate data ($R^2 \geq 0.994$). The smallest consistency factor (K) was calculated for the formulation containing 23±0.1 g/100 g of proteins and 3.0±0.1 g/100 g of dietary fiber. The low n values of all samples studied (0.100-0.170) indicated high pseudo-plasticity of the samples.

containing smaller amounts of proteins—23±0.1 g/100 g; it was in the range 84.78±2.06-85.93±1.98%. Having a higher amount of proteins in the formulations −25±0.1 g/100 g, higher values of stability after thermal treatment were achieved; it was in the range 90.12±2.51-93.61±0.65%.

TABLE 3

| Printability characteristics of formulations containing different amounts of proteins and dietary fiber. | | | | |
|---|---|---|---|---|
| | Protein content - 23 ± 0.1 g/100 g | | Protein content - 25 ± 0.1 g/100 g | |
| Characteristics | Dietary fiber content - 3.0 ± 0.1 g/100 g | Dietary fiber content - 4.0 ± 0.1 g/100 g | Dietary fiber content - 3.0 ± 0.1 g/100 g | Dietary fiber content - 4.0 ± 0.1 g/100 g |
| Printing accuracy, % | 96.63 ± 1.95 | 97.14 ± 1.39 | 97.35 ± 1.85 | 96.71 ± 2.09 |
| Printing stability, % | 98.50 ± 1.18 | 98.07 ± 1.26 | 98.49 ± 1.64 | 98.93 ± 1.13 |
| Stability after heat treatment, % | 84.78 ± 2.06 | 85.93 ± 1.98 | 90.12 ± 2.51 | 93.61 ± 0.65 |

The above ranges of meat proteins and dietary fiber contents are defined by their effective limits. Adding more proteins exceeding the upper limit (25%) may be the aim, however, it substantially worsens the printing properties of the printable formulation. Adding more than 4% of dietary fibers also makes 3D-printing less possible, while adding less than the minimal limit (3%) makes the nutritional value of the final product not sufficient.

The developed formulations were used for the 3D-printing of high protein and prebiotic dietary-fiber-rich finger food adapted to provide balanced nutrition for the elderly and people with swallowing disorders. Three categories of seasonings and flavourings were added into the formulations: beetroot-flavoured, meat-flavoured, and tomato-fla-

TABLE 2

| Physico-chemical characteristics of formulations containing different amounts of proteins and dietary fiber. | | | | | |
|---|---|---|---|---|---|
| | | Protein content - 23 ± 0.1 g/100 g | | Protein content - 25 ± 0.1 g/100 g | |
| Characteristics | | Dietary fiber content - 3.0 ± 0.1 g/100 g | Dietary fiber content - 4.0 ± 0.1 g/100 g | Dietary fiber content - 3.0 ± 0.1 g/100 g | Dietary fiber content - 4.0 ± 0.1 g/100 g |
| pH | | 5.81 ± 0.01 | 5.79 ± 0.01 | 5.71 ± 0.01 | 5.76 ± 0.02 |
| WHC, % | | 99.99 ± 0.01 | 99.99 ± 0.01 | 99.99 ± 0.01 | 99.99 ± 0.01 |
| Apparent viscosity η, Pa s at $\gamma = 2.5$ s$^{-1}$ | | 174.7 ± 8.0 | 263.3 ± 2.3 | 262.1 ± 9.9 | 370.0 ± 5.6 |
| Storage modulus G', Pa, at $\omega = 10.0$ rad/s | | 3196.7 ± 207.4 | 4510.0 ± 130.0 | 8125.0 ± 459.6 | 10500.0 ± 282.8 |
| Loss modulus G", Pa, at $\omega = 10.0$ rad/s | | 599.0 ± 31.6 | 779.3 ± 16.3 | 1270.0 ± 98.9 | 1160.0 ± 56.8 |
| Rheological parameters according to Herschel-Bulkley equation: | Consistency index κ, Pa s" | 1086.1 ± 29.7 | 6921.3 ± 1034.3 | 2836.1 ± 142.7 | 9173.5 ± 110.4 |
| | Flow index n | 0.122 ± 0.001 | 0.100 ± 0.001 | 0.165 ± 0.001 | 0.170 ± 0.001 |
| | $R^2$ | 0.983 ± 0.001 | 0.994 ± 0.001 | 0.995 ± 0.001 | 0.997 ± 0.001 |

The suitability of the formulations for 3D-printing was characterised by the following printability characteristics: printing accuracy, printing stability, and stability after heat treatment (Table 3). All tested formulations showed excellent printability characteristics. The printing accuracy of the formulations was in the range 96.63±1.95-97.35±1.85%, printing stability varied from 98.07±126 to 98.93±1.13%. Stability after heat treatment was lower for the formulations voured. Instrumental texture analysis, IDDSI testing, and sensory analysis were used to confirm that the 3D-printed and heat-treated finger foods of different flavours met the requirements for dysphagia-friendly food (Table 4). 67 participants were included in the sensory evaluation of 3D-printed finger foods: 52 women and 15 men; ages ranged between 77.9 (SD=7.5), a minimum of 60, and a maximum of 94.11 participants had dysphagia.

TABLE 4

| Textural characteristics of 3D-printed and heat-treated finger foods. | | | | |
|---|---|---|---|---|
| | Texture characteristics | | | IDDSI testing results |
| Sample | Hardness, g | Adhesion, g.s | Cohesiveness | Views in FIG. 2 |
| Finger food beetroot-flavoured | 29.5 ± 0.6 | −149.8 ± 1.4 | 0.330 ± 0.030 | View in FIG. 2 a) |
| Conclusion: soft, one bite size, level 6 according to IDDSI | | | | |
| Finger food tomato-flavoured | 27.6 ± 0.7 | −27.3 ± 4.0 | 0.263 ± 0.004 | View in FIG. 2 b) |
| Conclusion: soft, one bite size, level 6 according to IDDSI | | | | |
| Finger food meat-flavoured | 26.9 ± 1.5 | −12.6 ± 4.8 | 0.289 ± 0.006 | View in FIG. 2 c) |
| Conclusion: soft, one bite size, level 6 according to IDDSI | | | | |

The above table discloses the textural characteristics of the final product, produced from the printable formulation, comprising the ingredient proportions in ranges: dietary fibers—3% to 4%, and meat proteins—23% to 25%.

Instrumental texture analysis was performed to simulate the chewing behavior of the 3D-printed finger foods. Hardness, adhesiveness, and cohesiveness were registered to evaluate the textural properties of finger foods. Flavors added did not affect the hardness and cohesiveness of finger foods. The hardness was in the range of 26.9±1.5-29.5±0.6 g. Such low values of hardness suggest that finger foods will be easy to bite and squeeze between the tongue and palate.

Cohesiveness values show the internal strength of food bolus. Good cohesiveness helps to prevent the sudden disintegration of the product during swallowing which is important for safe swallowing. However, different flavoured finger foods differed in adhesiveness. Beetroot-flavoured finger food was characterised by the highest adhesion (−149.8±1.4 g.s). Tomato-flavoured and meat-flavoured finger foods showed similar values of adhesiveness. Foods with high adhesiveness values require more time to form a suitable bolus, therefore the swallowing of such foods can be accompanied by the risk of choking.

The categorisation of 3D-printed finger foods within the IDDSI levels is presented in Table 4. A fork pressure test, spoon tilt test, and fork separation test were performed. The results were similar for all three flavoured 3D-printed finger foods. When finger foods were pressed with the tines of a fork or spoon they squashed, broke apart, and did not return to their original shape when the fork or spoon was removed. Therefore, developed 3D-printed finger foods can be characterised as eaten by fork or spoon, easily cut without a knife into small pieces, chewing is required, but not biting, tender and moist without visible liquid separation. This is consistent with the description of level 6-soft & bite-sized foods according to IDDSI.

The ability to take food by hand is very important for older people who have difficulty with cutlery handling (apraxia) or remaining at the table for the entire duration of a meal. People with apraxia disorders use their fingers when eating, even if the food form is not suitable for that. According to the sensory analysis results (Table 5), the tomato product was perceived as easiest to handle by hand and the beetroot product was perceived as most difficult to handle by hand. However, 92%, 85%, and 66% of the participants gave scores equal to or higher than 6 for the tomato, meat, and beetroot product, respectively. All tested 3D-printed finger foods were characterised as easy to swallow with 61% of the participants giving the highest score (7) to the products. Regarding the liking questions, the colour and the mouthfeel of the meat-flavoured finger food were less liked than beetroot-flavoured and tomato-flavoured finger foods. All tested 3D-printed foods were rated as very soft with 83%, 84%, and 81% of the participants who gave the score 1 (soft) on the corresponding scale for the tomato-flavoured, meat-flavoured and beetroot-flavoured finger food. Regarding juiciness, the beetroot-flavoured finger food was perceived as juicier than the tomato-flavoured finger food; the meat-flavoured finger food was somewhere in between. However, all were characterised as quite juicy with average scores higher than 6. After swallowing the product the participants perceived a rather weak after-feel with an average score close to 3. However, no conclusion can be highlighted from the mouthcouting question because the ratings were associated with a large interindividual variability. In addition, older people suffering from dysphagia gave higher liking scores than people without dysphagia, both for the colour and mouth feeling questions. On the reverse, people with dysphagia perceived the after-feel of mouthcouting as lower than people without dysphagia. Women gave higher liking scores than men for colour and mouthfeel; they also tended to perceive the taste and aroma of the product as more intense than the men.

TABLE 5

| Results of sensory evaluation of 3D-printed finger foods | | | | | | |
|---|---|---|---|---|---|---|
| | 3D-printed food | | | | | |
| Question | Beetroot-flavoured | Meat-flavoured | Tomato-flavoured | $F_{product}$ | $F_{gender}$ | $F_{dysphagia}$ |
| Difficulty to take by hand | 5.63 ± 1.34 | 6.24 ± 1.02 | 6.54 ± 0.82 | 29.34 (<.0001) | 17.76 (<.0001) | 0.67 (0.42) |
| Liking of the colour | 5.46 ± 1.51 | 4.87 ± 1.55 | 5.70 ± 1.35 | 7.08 (0.001) | 7.24 (0.01) | 6.28 (0.01) |

TABLE 5-continued

Results of sensory evaluation of 3D-printed finger foods

| | 3D-printed food | | | | | |
| Question | Beetroot-flavoured | Meat-flavoured | Tomato-flavoured | $F_{product}$ | $F_{gender}$ | $F_{dysphagia}$ |
|---|---|---|---|---|---|---|
| Liking of the mouth feeling | 5.03 ± 1.59 | 4.35 ± 1.96 | 5.21 ± 1.71 | 7.44 (0.001) | 6.34 (0.01) | 2.95 (0.09) |
| The intensity of the taste and aroma | 4.05 ± 1.54 | 4.12 ± 1.55 | 3.75 ± 1.52 | 0.50 (0.61) | 3.19 (0.08) | 0.00 (0.95) |
| Firmness | 1.19 ± 0.47 | 1.25 ± 0.61 | 1.24 ± 0.66 | 1.04 (0.36) | 0.00 (0.98) | 0.24 (0.63) |
| Juiciness | 6.62 ± 0.78 | 6.26 ± 1.46 | 6.11 ± 1.70 | 2.77 (0.07) | 0.45 (0.50) | 1.34 (0.25) |
| Swallowing difficulty | 6.36 ± 1.19 | 6.15 ± 1.51 | 6.45 ± 0.91 | 1.93 (0.15) | 1.67 (0.20) | 1.57 (0.22) |
| Afterfeel intensity | 3.02 ± 1.50 | 3.14 ± 1.78 | 2.58 ± 1.27 | 2.19 (0.12) | 0.78 (0.38) | 6.15 (0.02) |
| Mouth couting after-feel | 4.64 ± 2.42 | 4.51 ± 2.19 | 4.84 ± 2.24 | 0.29 (0.75) | 0.83 (0.37) | 3.40 (0.07) |

The preferred range of beetroot, meat, or tomato flavorings is 1% to 2% w/w of the 3D-printable formulation composition.

To prove that composition of formulation and its intensive processing during the production of 3D-printed finger foods had no negative impact on the nutritional status of 3D-printed food, digestive degradation of the developed 3D-printed foods was analysed. Since the main component of the formulation is lean pork, we evaluated the digestibility of the 3D-printed finger food by comparing its degree of protein hydrolysis with that of heat-treated minced lean pork.

TABLE 6

Hydrolysis of proteins in-vitro in the gastric (G) and intestinal (D) phases.

| Digestion phase | Degree of proteolysis (%) | |
|---|---|---|
| | Heat-treated minced lean pork | 3D-printed finger food |
| G0 | 4.08 ± 1.17a | 7.04 ± 1.37b |
| G60 | 8.03 ± 1.73a | 9.83 ± 1.5a |
| G120 | 10.49 ± 1.38a | 11.09 ± 1.63a |
| D120 | 37.47 ± 0.85a | 34.03 ± 0.35b |
| D180 | 46.45 ± 4.93a | 43.17 ± 4.61a |

Values are presented as mean±standard deviation; lowercase letters indicate significant ($p<0.05$) differences between characteristics of heat-treated lean pork and 3D-printed finger food.

During the digestion period of the samples, no significant differences were found between the degree of proteolysis of heat-treated minced lean pork and 3D-printed food. Protein hydrolysis gradually, but slowly increased during the gastric digestion phase and at 120 min of digestion was 8.03±1.73% for lean pork and 9.83±1.5% for 3D-printed finger food. The protein hydrolysis profiles of lean pork and 3D-printed finger food during the duodenal phase were similar. At the end of duodenal digestion, the degree of proteolysis was in the same range—46.45±4.93% for the lean pork and 43.17±4.61% for the 3D-printed foods. Such results lead to the conclusion that neither the composition of the formulation, the fact that it contains structured oil and dietary fiber, nor its intensive processing have any effect on the protein digestibility.

The following numbered clauses present some embodiments and combinations thereof. Further features from the specification may be combined with one or more of the items.

1. A food composition, balanced by nutrients for the elderly and patients with swallowing disorders, the composition comprising:
   52.0-59.0 g/100 g of water;
   23.0-25.0 g/100 g of meat proteins;
   6.0-6.5 g/100 g of vegetable oil;
   3.0-4.0 g/100 g prebiotic dietary fibers.
2. The food composition according to clause 1, comprising:
   34-35 g/100 g of lean meat;
   39-44 g/100 g of water or broth;
   2-3 g/100 g of collagen;
   15-16 g/100 g of a bigel comprising the structured vegetable oil;
   1-2 g/100 g of seasonings for the taste, aroma, and color of food products;
   up to 1 g/100 g of sodium chloride as a salt;
   4-5 g/100 g of dietary-fiber-rich berry pomace as the prebiotic dietary fiber component.
3. The food composition according to clause 1 or 2, wherein the meat is lean pork.
4. The food composition according to clause 2, wherein the dietary-fiber-rich berry pomace is selected from any one of the berries: lingonberry, cranberry, sea buckthorn, and black currants, and preferably, the lingonberry and cranberry.
5. The food composition according to clause 2, wherein the seasonings for the taste, aroma, and color are any one of beetroot-flavor, tomatoes-flavor, and meat-flavor.
6. A method of preparing a food formulation from the composition of nutrients according to any one of clauses 1 to 5, the method comprising steps of
   pureeing the nutrients,
   blending the obtained purees of the nutrients, thereby obtaining the food formulation as the blended puree.
7. The method of clause 6 of preparing the food formulation from the composition according to any of clauses 2 to 5, comprising steps of
   a) preparing the meat, by cooking it in water, cooling it to room temperature, and mincing using a 0.2 mm sieve;

b) preparing the bigel system, wherein
  i. the hydrogel phase is prepared, by weighting and mixing 45% w/w of the collagen and the rest amount of the water;
  ii. the oleogel phase is prepared by mixing 1% w/w of emulsifier E471 and the vegetable oil;
  iii. each of both phases is separately heat-treated at 85° C. temperature for 30 minutes by constantly mixing, and
  iv. the oleogel-phase is mixed with the hydrogel-phase at a ratio 1:3 w/w, and the mixed both phases are emulsified at 85° C.;
c) preparing the prebiotic dietary fibers, wherein
  i. the berry pomace is dried to a moisture content of 7-9%;
  ii. the dried berry pomace is milled to 0.2-0.25 mm particles;
d) preparing the formulation by blending the ingredients prepared in (a), (b), and (c) steps, in the following order:
  i. blending for 3 minutes: the 34-35% w/w of the minced pork, the 39-44% w/w of the water or broth, the 4-5% w/w of the prebiotic dietary fibers, the 2-3% w/w of the collagen, the 1-2% w/w of the seasonings and natrium chloride; and after
  ii. the bigel is added into the mix obtained in step (i.) and further blended for 1 minute.

8. A food formulation prepared from the composition according to any of clauses 1 to 5, wherein said food formulation is a blended puree, having the shaping characteristics pH 5,6-5,9, WHC 99-100%, 3D-printing stability 95-99%, printing accuracy 95-99%, and stability after heat-treatment 85-99%.

9. The food formulation according to clause 8, wherein said food formulation is 3D-printable.

10. A method of preparing food products from the food formulation according to clauses 8 or 9, comprising steps of
  shaping said food formulation by an extrusion line, thereby obtaining shaped food products, and
  heat treating by baking the obtained shaped products.

11. The method according to clause 10, wherein the shaping of the food formulation is 3D-printing of a 3D-shaped food product.

12. The method according to cause 11, wherein the parameters of 3D-printing of the food formulation are:
  nozzle diameter—3.9-4.1 mm,
  print speed—13900-14100 mm/min,
  line thickness—3.2-3.6 mm,
  printing temperature—20-25° C.; and 13. The method according to claim 10, wherein the step of heat-treating of the shaped food object is performed until the temperature in the center of the heat-treated food object is reached 70-74° C. and for no longer than 5 minutes.

14. A food product prepared by the method according to any of clauses 10 to 13, wherein the obtained food product is soft and bite-sized, thereby complying with International Dysphagia Diet Standardization Initiative (IDDSI) level 6.

15. The food product of clause 14, wherein the design of the food product shape is a cylindrical shape with the size of one-bite, preferably, the cylindrical shape having 28-32 mm length and a diameter of 9-11 mm.

NONPATENT LITERATURE

Miles, A., Liang, V., Sekula, J., Broadmore, S., Owen, P., Braakhuis, A. J., 2020. Texture-modified diets in aged care facilities: nutrition, swallow safety and mealtime experience. Australas. J. Ageing 39 (1), 31-39. doi: 10.1111/ajag.12640

Dick, A., Bhandari, B., Dong, X., & Prakash, S. (2020). Feasibility study of hydrocolloid incorporated 3D printed pork as dysphagia food. *Food Hydrocolloids*, 107, Article 105940.

Dick, A., Bhandari, B., & Prakash, S. (2021). Printability and textural assessment of modified-texture cooked beef pastes for dysphagia patients. *Future Foods*, 3, Article 100006

Keerthana, K., Anukiruthika, T., Moses, J. A., & Anandharamakrishnan, C. (2020). Development of fiber-enriched 3D printed snacks from alternative foods: A study on button mushroom. *Journal of Food Engineering*, 287, Article 110116

Liu, Z., Bhandari, B., Prakash, S., & Zhang, M. (2018). Creation of internal structure of mashed potato construct by 3D printing and its textural properties. *Food Research International*, 111, 534-543

Pant, A.; Lee, A. Y.; Karyappa, R.; Lee, C. P.; An, J.; Hashimoto, M.; Tan, U.-X.; Wong, G.; Chua, C. K.; Zhang, Y. 3D food printing of fresh vegetables using food hydrocolloids for dysphagic patients. Food Hydrocoll. 2021, 114, 106546

Dick, A., Bhandari, B., Dong, X., & Prakash, S. (2020). Feasibility study of hydrocolloid incorporated 3D printed pork as dysphagia food. *Food Hydrocolloids*, 107, Article 105940.

Dick, A., Bhandari, B., & Prakash, S. (2021). Printability and textural assessment of modified-texture cooked beef pastes for dysphagia patients. *Future Foods*, 3, Article 100006

Lordan, C., Thapa, D., Ross, R. P., & Cotter, P. D. (2020). Potential for enriching next-generation health-promoting gut bacteria through prebiotics and other dietary components. *Gut Microbes*, 11(1), 1-20. https://doi.org/10.1080/19490976.2019.1613124

Augustin, L. S. A., Aas, A.-M., Astrup, A., Atkinson, F. S., Baer-Sinnott, S., Barclay, A. W., et al. (2020). Dietary fiber consensus from the international carbohydrate quality consortium (ICQC). *Nutrients*, 12, 2553.

Mansour Sedighi, Shabnam Razavi, Fatemeh Navab-Moghadam, Mohammad E. Khamseh, Fariba Alaei-Shahmiri, Amirhosein Mehrtash, Nour Amirmozafari, Comparison of gut microbiota in adult patients with type 2 diabetes and healthy individuals, Microbial Pathogenesis, 111, 2017, 362-369 J. Huebner, R. L. Wehling, R. W. Hutkins. Functional activity of commercial prebiotics. International Dairy Journal 17 (2007) 770-775.

M. Cunningham, M. A. Azcarate-Peril, A. Barnard, V. Benoit, R. Grimaldi, D. Guyonnet, G. R. Gibson, Shaping the future of probiotics and prebiotics, Trends in Microbiology, 29 (8) (2021), pp. 667-685, 10.1016/j.tim.2021.01.003.

Gibson, R. Hutkins, M. E. Sanders, S. L. Prescott, R. A. Reimer, S. J. Salminen, G. Reid, Expert consensus document: The International Scientific Association for Probiotics and Prebiotics (ISAPP) consensus statement on the definition and scope of prebiotics Nature Reviews Gastroenterology and Hepatology, 14 (8) (2017), pp. 491-502, 10.1038/nrgastro.2017.75.

Claire Sulmont-Rossé, Rafal Drabek, Valérie L. Almli, Hannelize van Zyl, Ana Patricia Silva, Martin Kern, Jean A. McEwan, Gastón Ares. A cross-cultural perspective on feeling good in the context of foods and beverages. Food Research International. Volume 115, 2019, 292-301.

Jansson, T., Jensen, H. B., Sundekilde, U. K., Clausen, M. R., Eggers, N., Larsen, L. B., Ray, C., Andersen, H. J., & Bertram, H. C. (2014). Chemical and proteolysis-derived changes during long-term storage of lactose-hydrolyzed ultrahigh-temperature (UHT) milk. *Journal of Agricultural and Food Chemistry*, 62, 11270-11278. https://doi.orq/10.1021/jf504104a Jean-Marc Delroissea, Anne-Lise Boulvin, Isabelle Parmentier, Robin Dubois Dauphin, Micheline Vandenbol, Daniel Portetelle. Quantification of *Bifidobacterium* spp. and *Lactobacillus* spp. in rat fecal samples by real-time PCR. Microbiological Research 163 (2008) 663-670.

Alice Layton, Larry McKay, Dan Williams, Victoria Garrett, Randall Gentry, and Gary Sayler. Development of *Bacteroides* 16S rRNA Gene TaqMan-Based Real-Time PCR Assays for Estimation of Total, Human, and Bovine Fecal Pollution in Water. Applied and environmental microbiology, 2006 72 (6), 4214-4224.

Catherine A. Kelty, Manju Varma, Mano Sivaganesan, Richard A. Haugland, and Orin C. Shanks. Distribution of Genetic Marker Concentrations for Fecal Indicator Bacteria in Sewage and Animal Feces. Applied and Environmental Microbiology. 2012, 78 (12), 4225-4232.

Monique Haarman and Jan Knol. Quantitative Real-Time PCR Analysis of Fecal *Lactobacillus* Species in Infants Receiving a Prebiotic Infant Formula. Applied and environmental microbiology, 2006, 72(4), 2359-2365.

Eunike Bahlinger, Samart Dorn-In, Philipp-Michael Beindorf, Sirkka Mang, Florian Kaltner, Christoph Gottschalk, Manfred Gareis, Karin Schwaiger. Development of two specific multiplex qPCRs to determine amounts of *Pseudomonas, Enterobacteriaceae, Brochothrix thermosphacta*, and *Staphylococcus* in meat and heat-treated meat products. International Journal of Food Microbiology, 2021, 337, 108932.

Mansour Sedighi, Shabnam Razavi, Fatemeh Navab-Moghadam, Mohammad E. Khamseh, Fariba Alaei-Shahmiri, Amirhosein Mehrtash, Nour Amirmozafari, Comparison of gut microbiota in adult patients with type 2 diabetes and healthy individuals, Microbial Pathogenesis, 111, 2017, 362-369.

The invention claimed is:

1. A method of preparing an animal protein and prebiotic dietary fiber rich food formulation for elderly and patients with swallowing disorders, the method comprising the steps of:

a) preparing lean meat by cooking the meat in water, cooling the meat to room temperature, and mincing the cooled meat;

b) preparing a bigel system, wherein i. a hydrogel phase consisting of collagen and water is prepared by weighing and mixing 45% w/w of collagen in water;

ii. an oleogel phase is prepared by mixing 1% w/w of emulsifier into vegetable oil;

iii. heat-treating the hydrogel phase and the oleogel phase separately at about 85° C. temperature for 30 minutes by constantly mixing, and iv. mixing the oleogel-phase with the hydrogel-phase at a ratio 1:3 w/w, where the mixed phases are emulsified at about 85° C.;

c) preparing prebiotic dietary fibers, wherein i. a berry pomace is dried to a moisture content of 7-9%;

ii. the dried berry pomace is milled to 0.2-0.25 mm particles;

d) blending the components prepared in steps (a), (b), and (c), in the following order:

i. blending for about 3 minutes: 34-35% w/w of the minced meat from the step a), 39-44% w/w of water or broth, 4-5% w/w of the prebiotic dietary fiber component from step c), 2-3% w/w of collagen, 1-2% w/w of seasonings, and natrium chloride; and ii. adding the bigel system of step b) into the blend obtained in step (i.) and further blending for 1 minute; and e) obtaining a formulation containing 3-4 g of dietary fiber and 23-25 g of animal protein in 100 g of the formulation, and wherein the obtained formulation is suitable for 3D-printing.

2. The method according to claim 1, wherein the meat is lean pork.

3. The method according to claim 1, wherein in step c) the berry pomace is selected from any one of the berries: lingonberry, cranberry, sea buckthorn, and black currants.

4. The method according to claim 1, wherein the seasonings in step d) are selected from any one of beetroot-flavor, tomatoes-flavor, and meat-flavor.

5. The method according to claim 1, wherein the food formulation obtained in step e) is a blended puree and the blended puree has the following characteristics: pH of 5.6-5.9, WHC of 99-100%, 3D-printing stability of 95-99%, printing accuracy of 95-99%, and stability after heat-treatment of 85-99%.

6. The method according to claim 5, wherein the method further comprises a step of shaping the food formulation obtained in step e) and heat-treating the shaped formulation.

7. The method according to claim 6, wherein the shaping is conducted by extrusion line or 3D-printing.

8. The method according to claim 7, wherein the shaping is conducted by 3D-printing with parameters of:

nozzle diameter—3.9-4.1 mm, print speed—13900-14100 mm/min, line thickness—3.2-3.6 mm, and printing temperature—20-25° C.

9. The method according to claim 6, wherein the step of heat-treating is performed such that the temperature in a center of the heat-treated and shaped formulation is 70-74° C. and for no longer than 5 minutes.

10. The method of claim 9, wherein the shaped formulation is soft and bite-sized, thereby complying with International Dysphagia Diet Standardization Initiative IDDSI) level 6.

11. The method according to claim 10, wherein design of the shaping is a cylindrical shape with the size of one-bite.

12. The method according to claim 11, wherein the cylindrical shape has a diameter of 28-32 mm and a length of 9-11 mm.

* * * * *